(12) United States Patent
Varshney et al.

(10) Patent No.: US 10,990,612 B2
(45) Date of Patent: Apr. 27, 2021

(54) METRIC-CENTRIC TRANSFORMATIONS OF MULTIDIMENSIONAL DATABASE DATA

(71) Applicant: Microsoft Technology Licensing, LLC, Redmond, WA (US)

(72) Inventors: Maneesh Varshney, Milpitas, CA (US); Sunil Nagaraj, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 16/235,910

(22) Filed: Dec. 28, 2018

(65) Prior Publication Data

US 2020/0210452 A1 Jul. 2, 2020

(51) Int. Cl.
*G06F 16/28* (2019.01)
*G06F 16/25* (2019.01)
*G06F 16/22* (2019.01)
*G06F 16/2455* (2019.01)

(52) U.S. Cl.
CPC ........ *G06F 16/283* (2019.01); *G06F 16/2282* (2019.01); *G06F 16/2456* (2019.01); *G06F 16/24556* (2019.01); *G06F 16/254* (2019.01)

(58) Field of Classification Search
CPC .............. G06F 16/283; G06F 16/254; G06F 16/2282; G06F 16/2456; G06F 16/24556

USPC ........................................................ 707/602
See application file for complete search history.

(56) References Cited

U.S. PATENT DOCUMENTS

| | | | |
|---|---|---|---|
| 9,652,451 B2* | 5/2017 | Elder | G06F 40/30 |
| 2004/0139061 A1* | 7/2004 | Colossi | G06F 16/283 |
| 2012/0290620 A1* | 11/2012 | Guan | G06F 16/242 707/779 |
| 2018/0089290 A1* | 3/2018 | Haggie | G06F 16/951 |
| 2019/0370369 A1* | 12/2019 | Kulkarni | G06F 16/9535 |
| 2020/0117757 A1* | 4/2020 | Yanamandra | G06F 16/951 |
| 2020/0210524 A1* | 7/2020 | Yang | G06F 16/3329 |

* cited by examiner

*Primary Examiner* — Dangelino N Gortayo
(74) *Attorney, Agent, or Firm* — Hickman Becker Bingham Ledesma LLP; Adam C. Stone (57) ABSTRACT

A computer system and method provide efficient, intuitive, and human-friendly ways of expressing metric-centric queries about multidimensional database data and, at the same, provide a level of flexibility for expressing various metric-centric queries in an interactive manner. The expression techniques help to more easily formulate metric-centric queries that require aggregation operations and joins. The flexible techniques facilitate interactive analysis of multidimensional data from different perspectives including consolidating, drilling down, and slicing and dicing the data. As a result, the analysis task for the data analyst and the programming task for the application developer may be easier, more efficient, and more effective.

20 Claims, 8 Drawing Sheets

| contributions | | |
|---|---|---|
| member_id | contribution_type_id | datetime |
| 23 | 4 | 12/2/2018 11:23 |
| ... | ... | ... |
| 124 | 6 | 12/12/2018 18:03 |

304A

| members | |
|---|---|
| id | country |
| 23 | US |
| ... | ... |
| 124 | CN |

306A

| contribution_types | |
|---|---|
| id | tag |
| 4 | "like" |
| ... | ... |
| 6 | "share" |

Figure 3A

300B sales — 302B

| amount | store_id | ... | product_id | date |
|---|---|---|---|---|
| $234.56 | 1020 | | 960 | 12/15/2018 |
| $769.34 | 1020 | | 570 | 7/6/2018 | stores — 304B

| id | manager | ... | city | state |
|---|---|---|---|---|
| 1020 | Johnson | | San Jose | CA |
| 5034 | Smith | | New York | NY | products — 306B

| id | source | ... | parts | cost |
|---|---|---|---|---|
| 960 | Acme | | 5 | $564 |
| 572 | Globex | | 2 | $23 |

Figure 3B

Figure 4

METRIC-CENTRIC TRANSFORMATIONS OF MULTIDIMENSIONAL DATABASE DATA

TECHNICAL FIELD

The disclosed implementations relate generally to online analytical processing, including, but not limited to, transforming multidimensional database data into metrics computed based thereon.

BACKGROUND

Online analytical processing (OLAP) computer systems exist for multidimensional data analysis. Such analysis may include developing query statements in a general-purpose database query language that supports aggregation operations and joins. In some existing OLAP systems, the Structured Query Language (SQL) is used to develop query statements for transforming multidimensional data into metrics computed based thereon. However, using SQL as the only means for accomplishing such transformations may still be inefficient and unintuitive because of SQL's general-purpose nature. For example, a data analyst or an application developer may find it cumbersome to use SQL to express query operations on database schemas such as, for example, query operations involving joins of multiple tables. In addition, the interactive nature of OLAP may require dynamic variation in query operations and expressing the variants using SQL may be tedious, time consuming, and error prone.

It is a challenge to express transformations of multidimensional database into metrics computed based thereon in an efficient, intuitive, and convenient manner. Human-friendly techniques for accomplishing such transformations are in great need.

SUMMARY

The appended claims may serve as a useful summary of some implementations of the present invention.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DETAILED DESCRIPTION

This disclosure provides example data processing systems and methods for online analytic processing.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

General Overview

Online analytical processing (OLAP) computer systems exist for multidimensional data analysis. Although the Structured Query Language (SQL) may be used to develop query statements for multidimensional data analysis in OLAP systems, there are a number of drawbacks associated with using a general-purpose query language such as SQL for expressing certain data transformations. For example, due to SQL's general-purpose design, a data analyst or an application developer may find it cumbersome to use SQL to express query operations on database schemas such as, for example, query operations involving joins of multiple tables. In addition, the interactive nature of OLAP may require dynamic variation in query operations and expressing all of the variants using SQL may be tedious, time consuming, and error prone. As a result, a human end-user or human application developer may need to spend significant time authoring SQL query statements directed to specific metric-centric inquiries about the data.

In addition, with some existing OLAP system, the underlying multidimensional database data may be stored in various types of databases that utilize different data storage formats, different degrees of normalization, and/or different levels of aggregation. For example, some multidimensional database systems may store pre-joined data while in others the data is not pre-joined. As another example, some multidimensional database systems may store pre-aggregated data while in others the data is not pre-aggregated. As a result, different SQL statements may be required for different OLAP systems to transform the underlying multidimensional database data into the same metric, thereby complicating the SQL statement formulation task for the data analyst or application programmer. Further, different OLAP systems may use different SQL dialects, also complicating the SQL formulation task.

Accordingly, there is a need for online analytical processing with more efficient and intuitive methods for expressing transformations of multidimensional database data into metrics computed based thereon. Such systems and methods optionally complement or replace conventional techniques for online analytical processing of multidimensional data.

Due to at least the challenges described above, it is desirable to have a system and method that allow for efficient, intuitive, and human-friendly ways of expressing metric-centric queries about multidimensional database data and, at the same, provide a level of flexibility for expressing various metric-centric queries in an interactive manner. The expression techniques help to more easily formulate metric-centric queries that require aggregation operations and joins. The flexible techniques facilitate interactive analysis of multidimensional data from different perspectives including consolidating, drilling down, and slicing and dicing the data. As a result, the analysis task for the data analyst and the programming task for the application developer may be easier, more efficient, and more effective. For example, with the techniques disclosed herein, the data analyst and application programmer need not be concerned whether the underlying multidimensional database data is pre-joined or pre-aggregated or concerned with the requirements of the particular SQL dialect understood by the underlying database system.

Thus, computing systems and methods are provided with more efficient methods for expressing transformations of multidimensional database data into metrics computed based thereon in a metric-centric manner thereby increasing the effectiveness, efficiency, and user satisfaction with such systems and methods. Such systems and methods may complement or replace conventional systems and methods for expressing transformations of multidimensional database data.

Metric Query Language

In addition, in some implementations, metric-centric transformations can be accomplished using a metric-centric query language referred to herein as "the metric query language," or just "MQL," for short. MQL provides a more convenient, yet still flexible, means for expressing metric-centric transformations of multidimensional database data into result metrics. The result metrics may include numerical metrics computed based on the multidimensional data such as those computed using an aggregation operation applied to the multidimensional data. Such an aggregation operation may include, but is not limited to, an average (arithmetic mean) of a set of values, a count of a set of data items, a minimum value of a set of values, a maximum value of a set of values, a medium of a set of values, a mode of a set of values, a range of a set of values, a mean ignoring null values of a set of values, a standard deviation of a set of values, a sum of a set of values, or a combination of multiple aggregation operations such as, for example, an average of minimum values of multiple sets of values, etc., or the like. For example, the MQL statement METRIC population FILTER region='Europe'; may represent the natural language question: "what is the total population of all countries in Europe?", and the result metric computed based on summing the individual populations of the countries in Europe.

In addition, a result metric may also include a list of ordered values. For example, the MQL statement "METRIC population BREAKDOWN DIM country TOP 5;" may represent the natural language question: "What are the top five countries in the world by population?", and the result metric computed based on ordering all countries in the world by their population.

In some implementations, an MQL statement may be expressed in a computer as a string of characters, which may have a character encoding representation (e.g., UTF-8) when processed programmatically as a set of bytes. As such, an application developer or other user can express an MQL statement in a familiar manner.

In some implementations, an MQL statement is composed of four types of clauses: a metric clause, a breakdown clause, a filter clause, and a time clause. In some implementations, only the metric clause is required, and the breakdown clause, the filter clause, and time clause are each optional. For example, the MQL statement "METRIC population;" may provide a numerical result metric that is the world's total population. As another example, the MQL statement "METRIC population BREAKDOWN DIM county TOP 5;" may provide an ordered value result metric that is the top 5 countries in the world by total population. As yet another example, the MQL statement "METRIC population FILTER region='Europe';" may provide a numeric result metric that is the total population of all countries in Europe. As yet still another example, the MQL statement "METRIC sales TIME 7;" may provide the amount of total sales for the past seven days.

The breakdown clause, the filter clause, and time clause may be combined in an MQL statement. For example, the MQL statement "METRIC population BREAKDOWN DIM country TOP 5 FILTER region='Europe';" may provide an ordered value result metric that is the top 5 countries by total population in Europe. As another example, the MQL statement "METRIC sales BREAKDOWN DIM country TIME 7;" may provide the amount of total sales for the past seven days by country. As yet another example, the MQL statement"METRIC sales BREAKDOWN DIM country FILTER region='Europe' TIME 7;" may provide the amount of total sales for the past seven days by country in Europe.

Expressing a metric-centric transformation of multidimensional data may be more convenient, more intuitive, and more human friendly using MQL than using SQL or other more general-purpose query language. In particular, unlike with SQL, expression of the equivalent MQL statement may not require explicitly specifying aggregation operations or joins in the MQL statement. For example, the SQL statement equivalent to "METRIC sales amount BREAKDOWN DIM city FILTER state='CA' TIME 7;" may be "SELECT SUM (sales.amount) FROM sales, stores WHERE sales.store_id=stores.id, sales.date>=daysago(7), AND stores.state= 'CA' GROUP BY sales.city." By using MQL instead of SQL to express the metric-centric transformation, an express specification of an aggregation operation (e.g., "SUM(sales.amount)) and a join (e.g., "sales.store_id=stores.id") is not needed, thereby simplifying the burden on the user.

Because explicitly expressing aggregation operations and joins is not required of an MQL statement in order to transform multidimensional database data to result metrics, MQL is more metric-centric than a more general-purpose query language such as, for example, SQL. The metric-centric nature of MQL reduces the cognitive burden on the user expressing an MQL statement and allows the user to focus more on the metric-specific aspects of inquiry at hand such as, for example, the particular metric desired, how the metric should be broken down by dimension(s), the relevant time period of the data of interest, and filter(s) to apply to select a subset of the data for inclusion in the metric computation. In contrast, with a more general-purpose query language such as SQL, the user must focus on these aspects in addition to how to form a query statement in the general-purpose query language that includes the appropriate aggregation operation and joins. As a result, MQL improves the efficiency of analyzing multidimensional database data by being more metric-centric and limiting the complexity of query statement expressions that are needed to effectively and flexibly transform multidimensional database data to metrics of interest, resulting in an improved data query language for online analytical processing computer systems.

Metric Clause

As mentioned, in some implementations, an MQL statement includes a metric clause and optionally one or more of a breakdown clause, a filter clause, and a time clause. The metric clause may be used in an MQL statement to specify a target metric of interest. The metric clause may include the keyword "METRIC" following by an identifier (e.g. name) of the target metric may be indicated in a metric clause by its name. For example, the metric clause "METRIC population" specifies a target metric identified by the name "population."

While in some implementations the keyword "METRIC" is used in a metric clause, another keyword is used in other implementations. Thus, an implementation is not limited to any particular keyword for specification in a metric clause. For example, the keyword "MEASURE" (or another synonym of "metric") may be used in an implementation instead of, or as a substitute for, the keyword "METRIC." It should also be noted that a metric clause, and more generally an MQL statement, may be case insensitive with respect to keywords used. For example, them metric clause "metric population" may be semantically equivalent to "METRIC population."

A target metric specified in a metric clause may be conceptual and need not (but can) directly identify underlying schema elements of the database schema of the multidimensional database data that is transformed into the target metric. For example, the target metric "population" may be computed based on data stored in multiple relational database tables, none of which are named or identified in the relational database schema definition as "population" or have columns named or identified in the schema definition as "population." Instead, the transformation, in some implementations, is accomplished using metadata for the target metric that allows the MQL statement containing to metric clause to be translated to an equivalent SQL statement that can be executed against the relational database in order to achieve the desired data transformation. As such, knowledge of the particular tables and columns of the underlying relational database schema is not needed in order to formulate an MQL statement for achieving the desired data metric-centric data transformation.

In some implementations, a metric clause may contain an arithmetic expression having target metrics as operands. The operators of the arithmetic expression may include, but is not limited to, addition ('+'), subtraction ('−'), division ('/'), multiplication ('*'), and modulo ('%') operators. For example, the MQL statement "METRIC population_us+population_europe" may sum the numerical target metric "population_us" and the numerical target metric "population_europe" to provide the total population in Europe and the United States.

Breakdown Clause

A breakdown clause may be used with a metric clause in an MQL statement to specify one or more target groupings for the target metric. In some implementations, the breakdown clause includes the keyword "BREAKDOWN" and an identifier or name of a target grouping. The target grouping may a dimension of the multidimensional database data, as opposed to a measure of the multidimensional data.

For example, consider the MQL statement to obtain a result metric that a sum of the total sales for all countries in each region: "METRIC sales_country BREAKDOWN region." For example, this example MQL statement may be translated to the following example SQL statement according to the metric metadata for the target metric: "SELECT countries.region, sum(sales.amount_sold) FROM sales JOIN countries ON sales.country_id=countries.country_id GROUP BY countries.region." In this SQL statement, an aggregation operation ("SUM") is applied to "amount_sold" measures per country and broken down by region to which the country belongs where the region is a dimension of the sales measures. Advantageously, as illustrated by this example, it is not necessary for the MQL statement to specify the aggregation operation or the join that is specified in the SQL statement in order to obtain a desired result metric that is broken down based on (grouped by) a selected dimension of the measures, thereby simplifying the task of formulating a metric-centric query statement in which metrics are grouped by a dimension of measures of the multidimensional data.

While in some implementations the keyword "BREAKDOWN" is used in a breakdown clause, another keyword is used in other implementations. Thus, an implementation is not limited to any particular keyword for specification in a breakdown clause. For example, the keyword "GROUPING" or a set of keywords such as, for example, "BREAKDOWN DIM" (for breakdown by dimension) may be used in an implementation instead of, or as a substitute for, the keyword "BREAKDOWN." It should also be noted that a breakdown clause, and more generally an MQL statement, may be case insensitive with respect to keywords used. For example, the breakdown clause "breakdown subregion" may be semantically equivalent to "BREAKDOWN subregion."

It is also possible for a breakdown clause to specify more than one dimension to achieve a breakdown of the result metric by multiple dimensions. For example, the MQL statement "METRIC sales country BREAKDOWN region, subregion" may return a result metric based on grouping per-country sales amounts into groups where each group has countries with the same region and the same subregion and then summing the per-country sales amounts in each such group. For example, this example MQL statement may be translated to the following example SQL statement according to the metric metadata for the target metric: "SELECT countries.region, countries.subregion, sum(sales.amount_sold) FROM sales JOIN countries ON sales.country_id=countries.country_id GROUP BY countries.region, countries.subregion." Advantageously, as illustrated by this example, it is not necessary for the MQL statement to specify the aggregation operation ("SUM") or the join ("JOIN countries ON sales.country_id=countries.country_id") that is specified in the SQL statement in order to obtain a desired result metric that is broken down based on (grouped by) a selected multiple dimensions (region, subregion) of the measures (per-country sales amounts), thereby simplifying the task of formulating a metric-centric query statement in which metrics are grouped by multiple dimensions of measures of the multidimensional data.

In some implementations, a breakdown clause can be used to limit the number of results returned in each grouping of an ordered result metric to a specified number. In particular, a breakdown clause may include the keyword "TOP" or the like followed by an integer 'N' to limit the number of results returned in each group of ordered results to the top N number of results. For example, the MQL statement "METRIC unique_contributors" BREAKDOWN country TOP 5" may return the top 5 countries by the total number of contributors to an online social network. This MQL statement may be translated into the SQL statement: "SELECT approx_distinct(contributor.id), member.country FROM contributor JOIN member ON contributor.id=member.id GROUP BY member.country ORDER BY approx_distinct (contributor.id) DESC." It should be noted that the example SQL statement does not limit the results returned to the top 5. However, a result cursor supported by the underlying relational database management system may be used to extract the top 5 results from one or more sets of results returned by the relational database management system using the cursor without having to receive all results. Advantageously, as illustrated by this example, it is not necessary for the MQL statement to specify the join ("JOIN member ON contributor.id=member.id") that is specified in the SQL statement in order to obtain a desired result metric that is limited to the top 5 results, thereby simplifying the task of formulating a metric-centric query statement in which metrics are limited a specified top (or bottom) number of ordered results. One skilled in the art will appreciate that a bottom number of results could be similarly implemented using "BOTTOM <N>" or the like in the breakdown clause and ordering results returned by the SQL statement in ascending order instead of in descending order.

A target dimension specified in a breakdown clause may be conceptual and need not (but can) directly identify underlying schema elements of the database schema of the multidimensional database data that is transformed into a target metric. For example, the target dimension "region" of the breakdown clause "BREAKDOWN region" may be computed based on data stored in a column of a relational database table, neither of which are named or identified in the relational database schema definition as "region." Instead, the transformation, in some implementations, is accomplished using metadata for the target metric that allows the MQL statement containing to breakdown clause to be translated to an equivalent SQL statement that can be executed against the relational database in order to achieve the desired data transformation. As such, knowledge of the particular tables and columns of the underlying relational database schema is not needed in order to formulate an MQL statement for achieving the desired data metric-centric data transformation.

While in some implementations a breakdown clause specifies a breakdown for the target metric by a dimension, a breakdown clause specifies a breakdown from the target metric by time. For example, the MQL statement: "METRIC population BREAKDOWN month" may breakdown the population by month of the year. It should be noted that a breakdown clause that specifies a time period is distinct from, but can be used in conjunction with, a TIME clause. In particular, a time period specified in a BREAKDOWN clause may specify a time period by which to categorize the measures of the target metric selected whereas a time period specified in a TIME clause may specify a range of time for selecting the measures of the target metric. For example, the MQL statement "METRIC sales BREAKDOWN month TIME past year" may select sales measures dated within the past year and then breakdown those selected sales measures by month.

Filter Clause

A filter clause may be used with a metric clause in a MQL statement to specify one or more filtering predicates on measures and/or dimensions that have the effect of limiting the measures that are included in a target metric calculation. In some implementations, the filter clause includes the keyword "FILTER" and a predicate expression. A filtering predicate may use an operator including, but not limited to, equals ('='), not equal ('<>'), greater than ('>'), greater than or equal to ('>='), less than ('<'), less than or equal to ('<='), in ('IN'), between ('BETWEEN'), like ('LIKE'), is null ('IS NULL'), or is not null ('IS NOT NULL'). A filter predicate can be enclosed in parentheses, and the keywords 'AND' and 'OR' may be used to combine filtering predicates into a new filtering predicate. If multiple filtering predicates are combined, parentheses can be used to group filtering predicates to indicate the order of evaluation. In the absence of parentheses, 'AND' may take precedence over 'OR'.

While a MQL statement may include just a metric clause and a filter clause, a filter clause may be combined with a breakdown clause in a MQL statement. For example, the MQL statement"METRIC members BREAKDOWN DIM contributor_type contribution_type FILTER contribution_type IN ('like', 'share', 'message')" may represent an inquiry about how many members contributed to a social network for each of a like, a share, and a message contribution type.

A target filter predicate specified in a filter clause may be conceptual and need not (but can) directly identify underlying schema elements of the database schema of the multidimensional database data that is transformed into a target metric. For example, the target filter predicate "contribution_type IN ('like', 'share', 'message')" may be computed based on data stored in a column of a relational database table, neither of which are named or identified in the relational database schema definition as "contribution_type" or have values of 'like', 'share', or 'message'. Instead, the transformation, in some implementations, is accomplished using metadata for the target metric that allows the MQL statement containing to filter clause to be translated to an equivalent SQL statement that can be executed against the relational database in order to achieve the desired data transformation. As such, knowledge of the particular tables and columns of the underlying relational database schema is not needed in order to formulate an MQL statement for achieving the desired data metric-centric data transformation.

Time Clause

A time clause may be used in a metric clause in a MQL statement to constrain the measures that included in a target metric calculation to those that fall within a certain period of time according to the multidimensional data. In some implementations, the time clause includes a "TIME" keyword and a time expression. The time expression may indicate a time period. The time period may be expressed using a date(s) (e.g., specifying or indicating a year, month, and day), a time(s) (e.g., specifying or indicating an hour, minute, and second in UTC), a time with a time zone (e.g., specifying or indicating an hour, minute, and second in a specified or implied time zone), a timestamp(s) having a date portion and a time portion (e.g., specifying or indicating a date according to the Gregorian calendar for the date portion and a time in UTC for the time portion), or a timestamp(s) with a time zone having a date portion and a time portion (e.g., specifying or indicating a date according to the Gregorian calendar for the date portion and a time in a specified or implied time zone for the time portion). If only a single date, time, or timestamp is specified, then the time period may be relative to a current time.

For example, the example MQL statement "METRIC members BREAKDOWN DIM contributor_type contribution_type FILTER contribution_type IN ('like', 'share', 'message') TIME 7" may represent an inquiry about how many members contributed to a social network for each of a like, a share, and a message contribution type in the past seven days. Here, days, as opposed to seconds, weeks, months, or other period of time, is implied. However, a time clause may also explicitly specify a period of time qualifier using a keyword such as "DAYS," "MINUTES," "MONTHS," etc.

System Architecture and MQL Engine

Figure 2A:
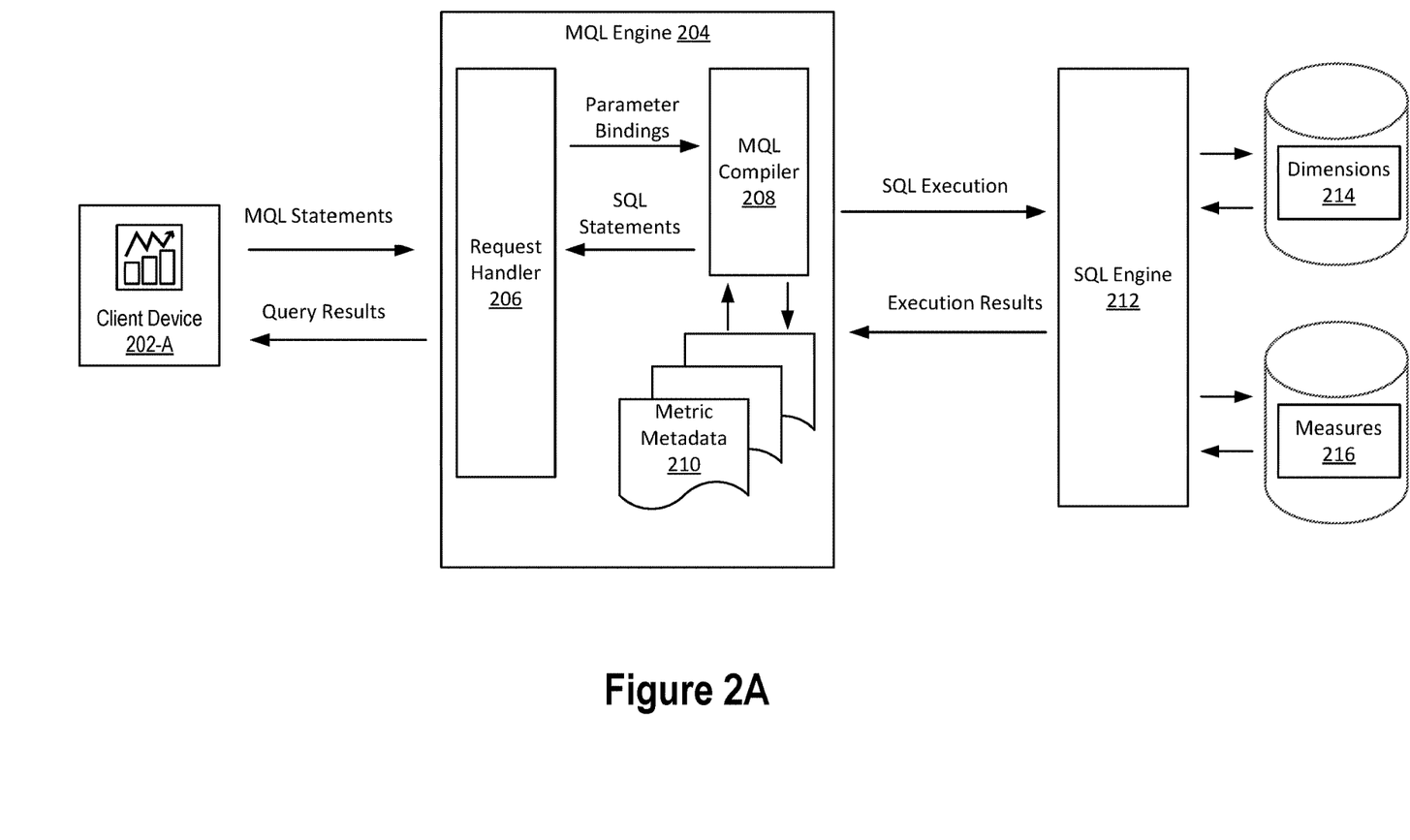
FIG. 2A-2D illustrate example system architectures in accordance with some implementations.

FIG. 2A illustrates a representative system architecture with a MQL engine 204. The MQL engine 204 processes an MQL statement received from a client device 202 (e.g., including a client application and an optional user interface) to transform the MQL statement to an equivalent SQL statement, and sends the SQL statement to a SQL engine 212 for execution against multidimensional database data that includes measures 216 and dimensions 214.

In some implementations, MQL is used to define metric-centric inquiries in the form of MQL statements and the MQL statements are compiled into equivalent SQL statements which can be executed by the SQL engine 212. MQL helps MQL statement authors focus on the specifics of the metric-centric inquiry and to not concern themselves with the problem of generating SQL.

While the syntax of MQL may be similar in some respects to SQL, there are important differences. In particular, MQL uses information specified in metric metadata 210 to automatically aggregate data in underlying columns, thereby making it easier to express metric-centric transformations involving aggregations. In addition, information in the metric metadata 210 may be used to automatically join measures 216 with dimensions 214, thereby simplifying the task of expressing metric-centric transformation involving joins.

In some implementations, MQL is structured as a collection of metric metadata definitions 210. In order to actually generate SQL, the MQL compiler 208 requires at least one metric metadata definition 210 be specified as an entry point, along with parameters bindings for that definition. FIG. 2A illustrates the role of the MQL compiler 208 in the MQL engine 204. When the MQL engine 204 receives a MQL statement from a client 202, a request handler 206 first translate the MQL statement into parameter bindings to pass to the MQL compiler 208, which returns a generated SQL statement. The request handler 206 then has the SQL statement executed by the SQL engine 212 against the multidimensional data that includes the measures 216 and dimensions 214 and forwards the results back to the client 202, optionally with some pre-processing of the results before forwarding (e.g., limiting ordered results to the top N number).

In FIG. 2A, the client 202-A is a graphical user interface-based client where the MQL statement is sent from the client 202-A to the MQL engine 204 based on user input directed to the graphical user interface. However, command line clients 202-B (FIG. 2B) and autonomously operating clients 202-C (FIG. 2C) are also possible.

Figure 2B:
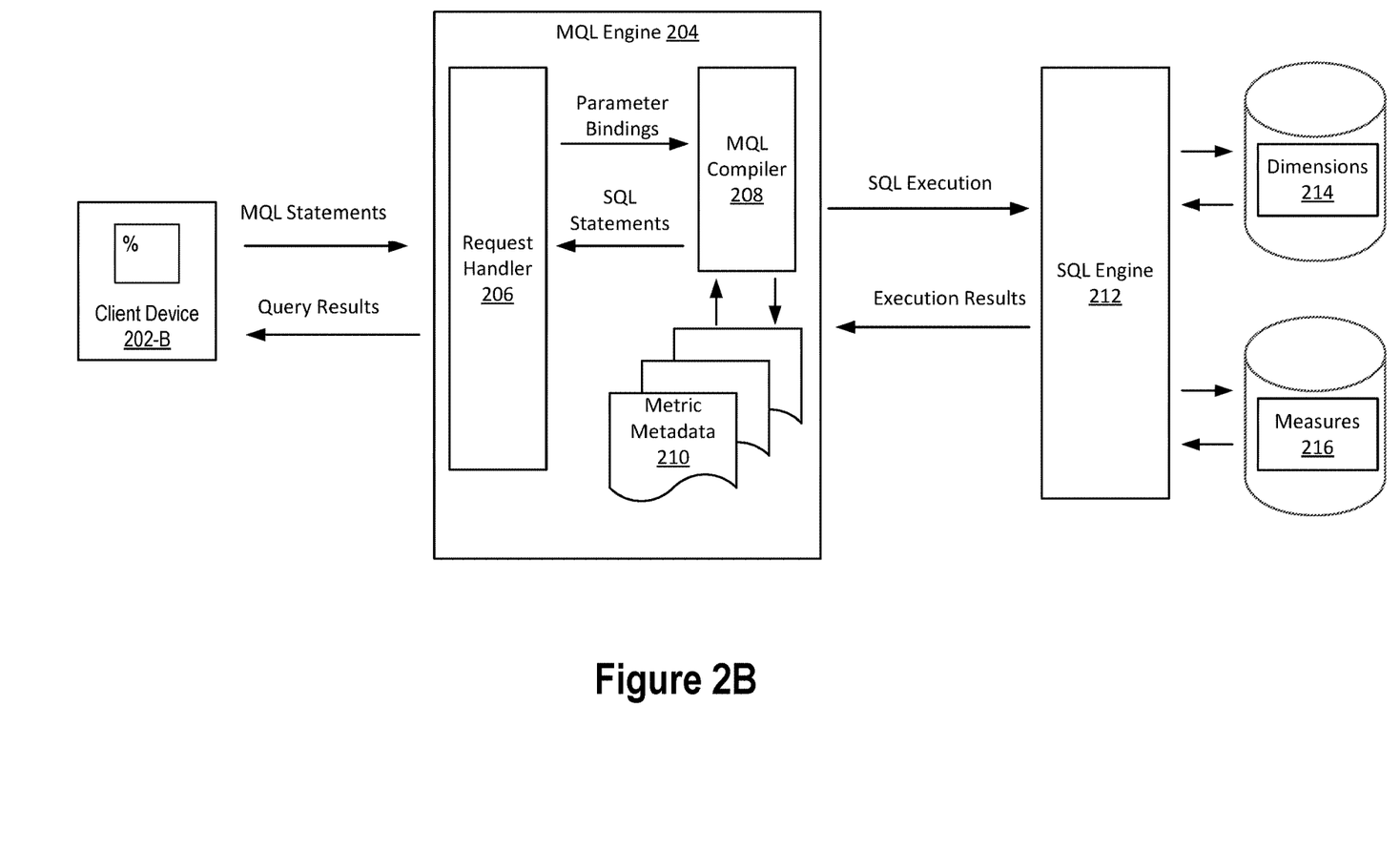
Figure 2C:
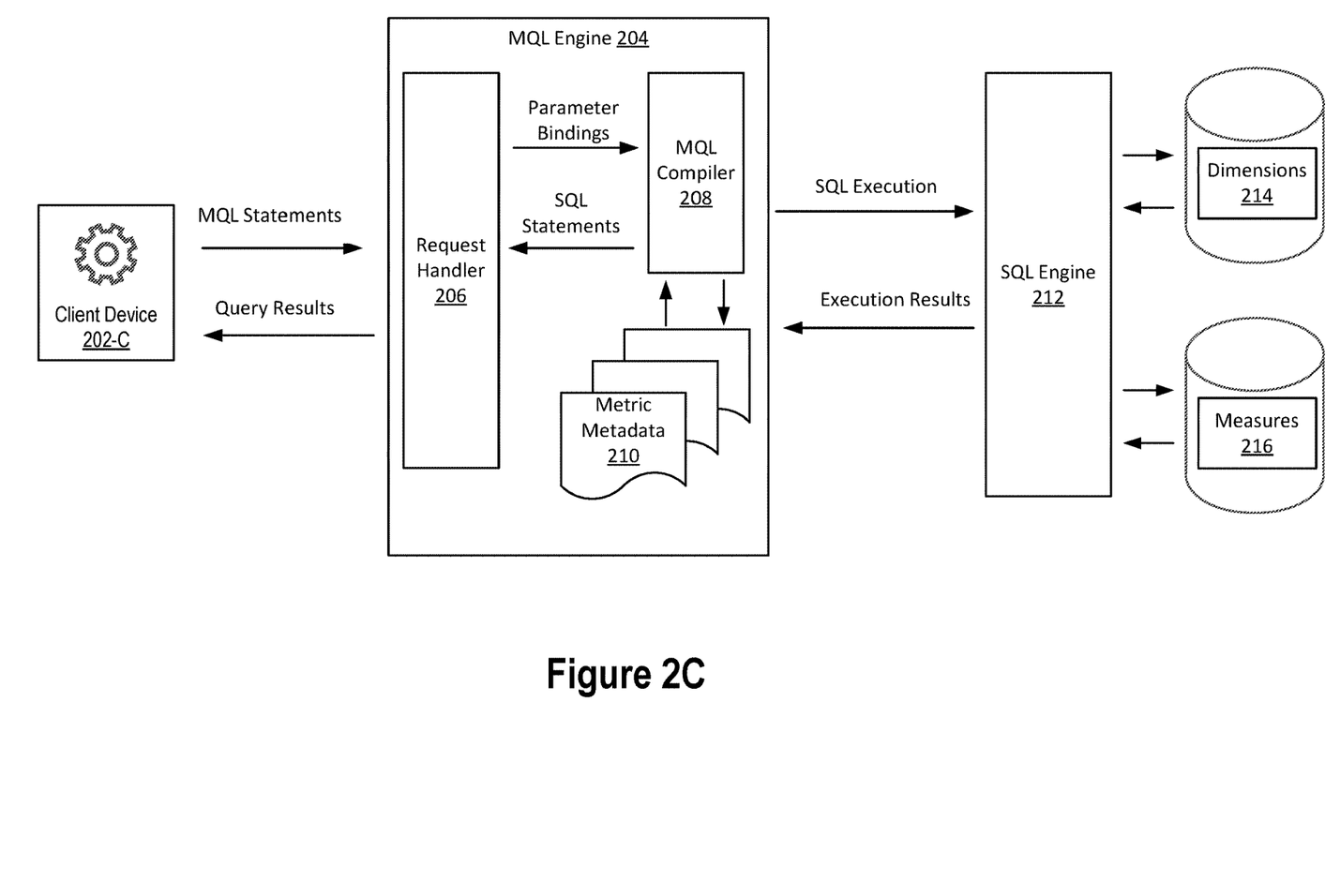
Figure 2D:
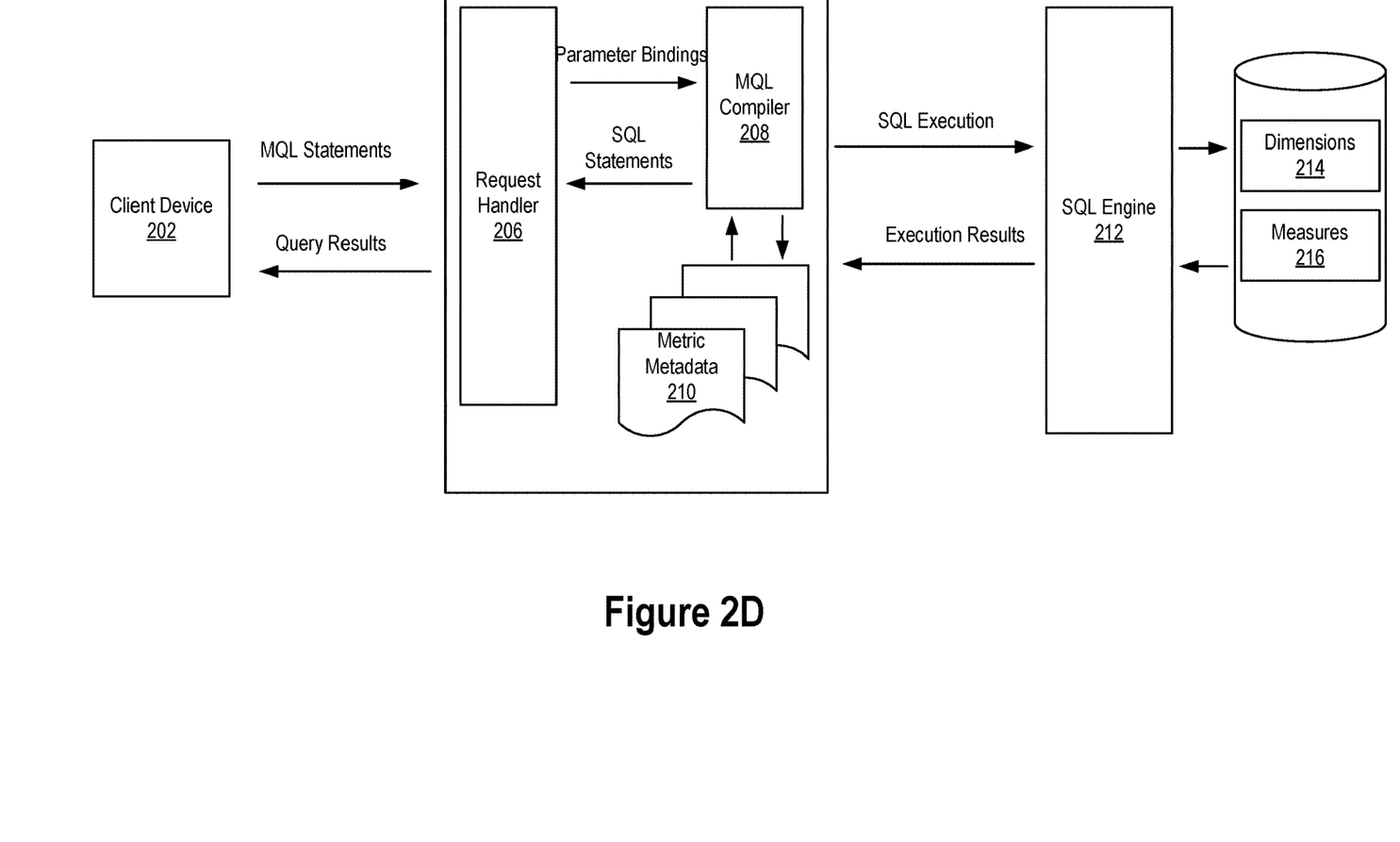

While measures 216 and dimensions 214 may be stored and managed by separate database systems as shown in FIG. 2A, FIG. 2B, and FIG. 2C, they may also be stored and managed in the same database system as shown in FIG. 2D. In either case, there is a SQL engine 212 that provides a SQL interface for querying the measures 216 and dimensions 214 of the multidimensional database data.

MQL is a query language for specifying data transformations. In some implementations, the MQL compiler 208 automatically determines how to aggregate query results. In addition, in some implementations, the MQL compiler 2018 automatically determines how to join measures 216 with dimensions 214. Automatic aggregation and automatic joins simplify the specification of MQL statements for client applications.

To take advantage of automatic aggregation, the metric metadata 210 may optionally specify columns of tables of measures 216 and/or columns of tables of dimensions that are aggregable. For each such aggregable columns, the metric metadata 210 may specify, in the context of a target metric, an aggregation operation to perform on values in the aggregable columns (e.g., SUM, COUNT, etc.). When an MQL statement referencing a target metric is processed, the aggregable column associated with the target metric in the metric metadata 210 is implicitly aggregated for selected rows, based on the associated aggregation function.

Figure 3A:
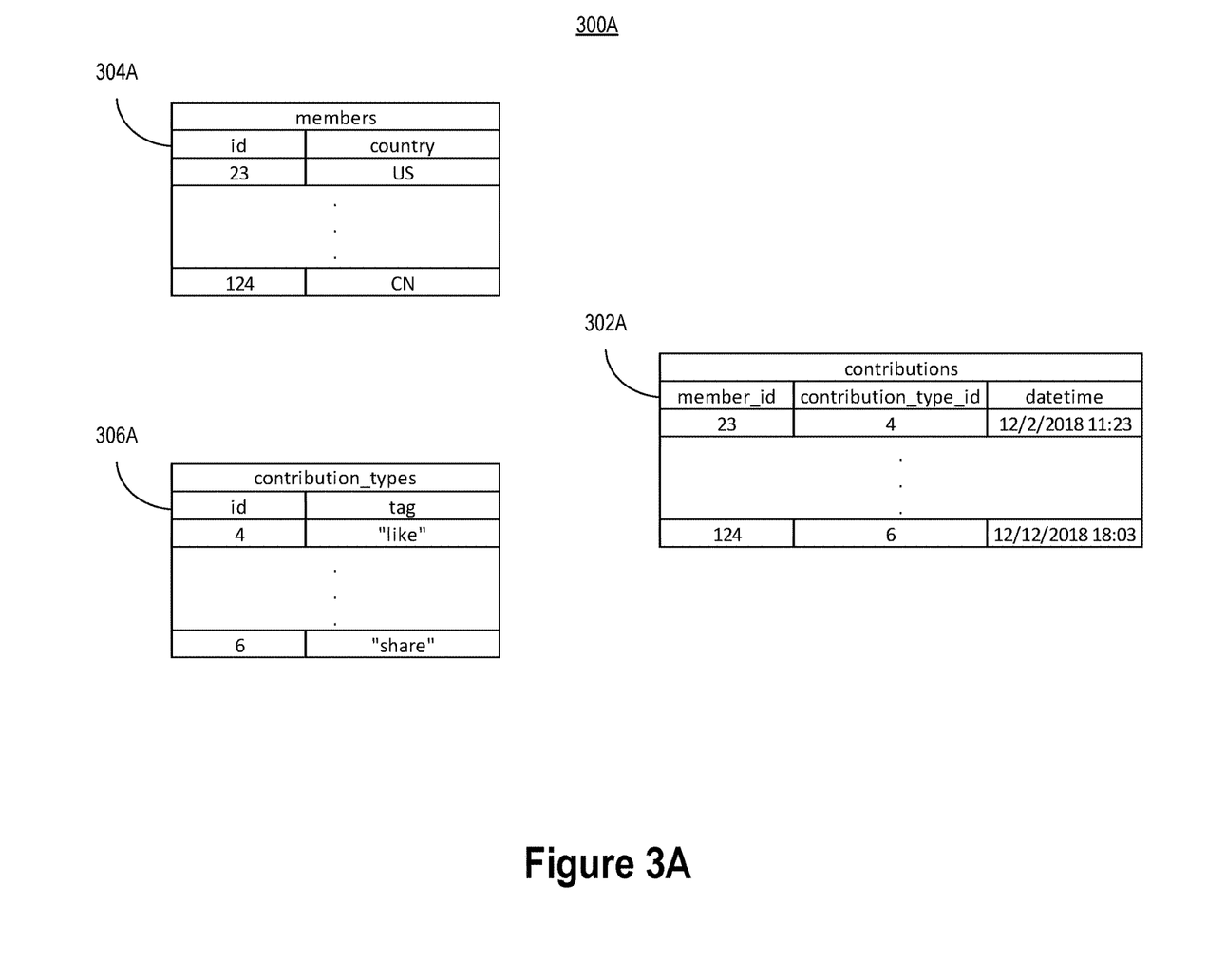
FIG. 3A-3B illustrate example multidimensional database data schemas in accordance with some implementations.
Figure 3B:
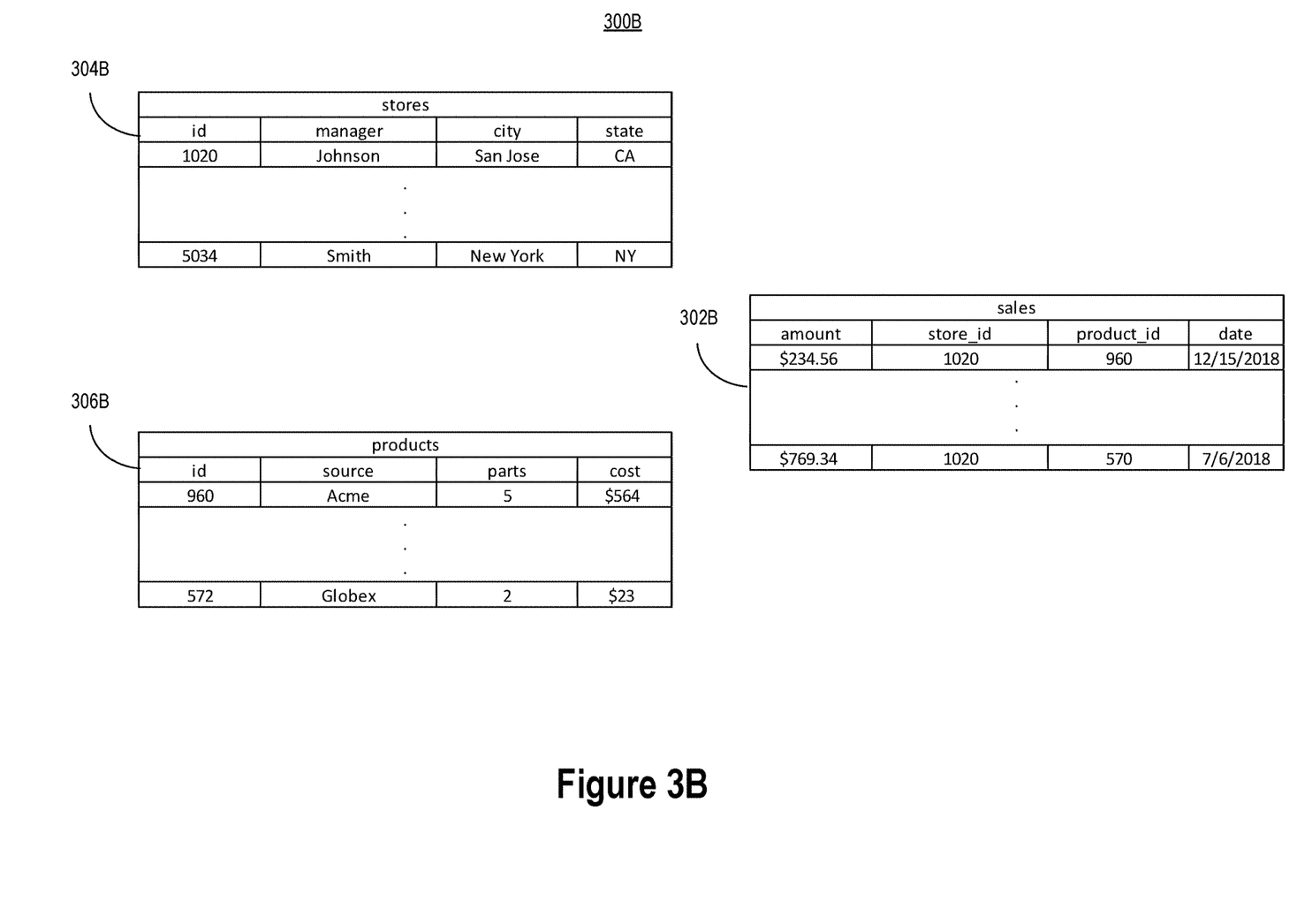

For example, the metric metadata 210 for a target metric "sales" may be associated with an aggregable column "amount" of a sales table 302B of the multidimensional data 300A of FIG. 3B and the SUM aggregation function. When an MQL statement references a target metric in its metric clause, the MQL compiler 208 can automatically generate a SQL statement that applies the associated aggregation function to the associated aggregable column. For example, the MQL compiler 208 may generate the SQL statement "SELECT SUM (sales.amount) from sales" given the MQL statement "METRIC sales" and the metric metadata 210 for the target metric "sales."

To take advantage of automation joins, the metric metadata 210 for a target metric may specify a foreign key column of a measures 216 table and a dimension key column of a dimensions 214 table. The foreign key column and the dimension key column may be used in a join in a SQL statement generated for an MQL statement that requires the join. For example, the MQL statement "METRIC members BREAKDOWN DIM contribution type FILTER contribution_type IN ('like', 'share', 'message')" when intended to be evaluated against the multidimensional data 300A depicted in FIG. 3A requires a join between the contributions table 302A and the contribution types tables 306A. The join is needed to fulfill the breakdown clause and the filter clause. For example, the following SQL statement may be generated by the MQL compiler 208 for this MQL statement: "SELECT COUNT (*) FROM contributions LEFT OUTER JOIN contribution types ON contributions.contribution_type_id=contribution_types.id WHERE contribution_types.tag in ('like', 'share', 'message') GROUP BY contribution_types.id"

Example Multidimensional Data

FIG. 3A depicts example multidimensional data 300A having a measure 216 table 302A named "contributions" and two dimension 214 tables 304A and 304B named "members" and "contribution types," respectively.

FIG. 3B depicts example multidimensional data 300B having a measure 216 table 302B named "sales" and two dimension 214 tables 304B and 306B named "stores" and "products," respectively.

Figure 4:
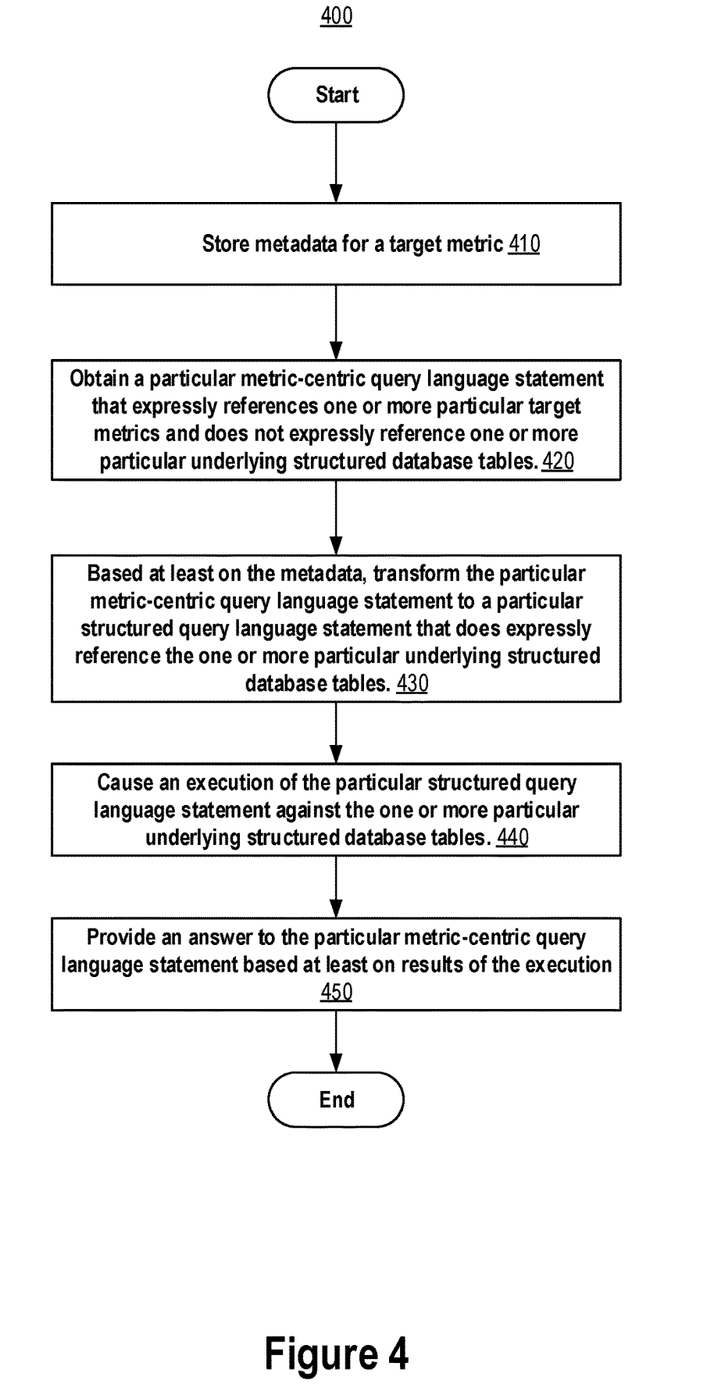
FIG. 4 is a flowchart of a process for metric-centric transformations of multidimensional database data, according to some implementations.

Example Process for Metric-Centric Transformation of Multidimensional Database Data FIG. 4 is a flowchart of an example process 400 for metric-centric transformation of multidimensional database data, according to some implementations.

Process 400 begins by storing (410) and maintaining metadata (e.g., 210) for target metrics. The metadata may include such information as names or monikers for the target metrics that may be used within MQL statements to reference the target metrics. In addition, the metadata for a target metric may include information about the dimensions by which the target metric can be broken down and references in a breakdown clause of a MQL statement that includes a metric clause that references the target metric. In addition, the metadata for a target metric may include information about the filters that can be used with the target metric. More generally, the metadata stored for a target metric may contain information that constrains the set of dimensions referenced in a breakdown clause to those that are compatible with the target metric when referenced together in the same MQL statement. Similarly, the metadata stored for a target metric may contain information that contains the set of filters referenced in a filter clause to those that are compatible with the target metric when referenced together in the same MQL statement. Here, compatibility may be defined in terms of the ability to form a valid SQL statement that can be successfully executed against the multidimensional database data at hand to obtain the target metric broken down and/or filtered according to the compatible breakdown clause and/or filter clause. Metadata for a target metric may also contain other information such as aggregation operation information (e.g., SUM, COUNT, AVG, etc.) for generating a SQL statement that includes the aggregation operation. The other information may also include foreign key column identifiers and dimension key columns identifiers for generating SQL statements that include the appropriate joins between measures (e.g., 216) and dimensions (e.g., 214) of the multidimensional database data.

Next, at operation 420, an MQL statement is received by the MQL engine 204. The MQL statement may reference one or more target metrics and may not expressly reference one or more underlying database tables containing the multidimensional database data. For example, the MQL statement may not expressly reference a table or tables containing measures (e.g., 216) or dimensions (e.g., 214). In this, the MQL statement can be formulated and submitted to the MQL engine 204 without requiring knowledge of or access to the underlying database schema and the names of columns and tables containing the multidimensional database data, thereby making the MQL statement more metric-centric that an equivalent SQL statement.

Next, at operation 430, the MQL statement received 402 is transformed to an equivalent SQL statement 420 based on the metadata stored 410 for the target metric or target metrics specified in the MQL statement. Such transformation may include generating a SQL statement that includes an aggregation operation implied by the target metric(s) specified and/or a join implied by any breakdowns or filters specified in the MQL statement. Unlike the MQL statement, the generated MQL statement may expressly reference underlying database tables and columns containing the multidimensional database data including tables and columns containing measures (e.g., 216) and dimensions (e.g., 214).

Next, at operation 440, the MQL engine 204 causes an execution of the generated SQL statement by the SQL engine 212 against the multidimensional database data (e.g., measures 216 and dimensions 214) including the underlying database tables expressly referenced in the SQL statement.

Finally, at operation 450, the results obtained from the execution of the SQL statement by the SQL engine 212 are provided to the client 202.

Example Computer System

Some implementations encompass performance of a method by a computing system having one or more processors and storage media. The one or more processors and the storage media may be provided by one or more computer systems. The storage media of the computing system may store one or more computer programs that include instructions configured to perform the method and that are executed by the one or more processors to perform the method.

For an implementation that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive.

Figure 1:
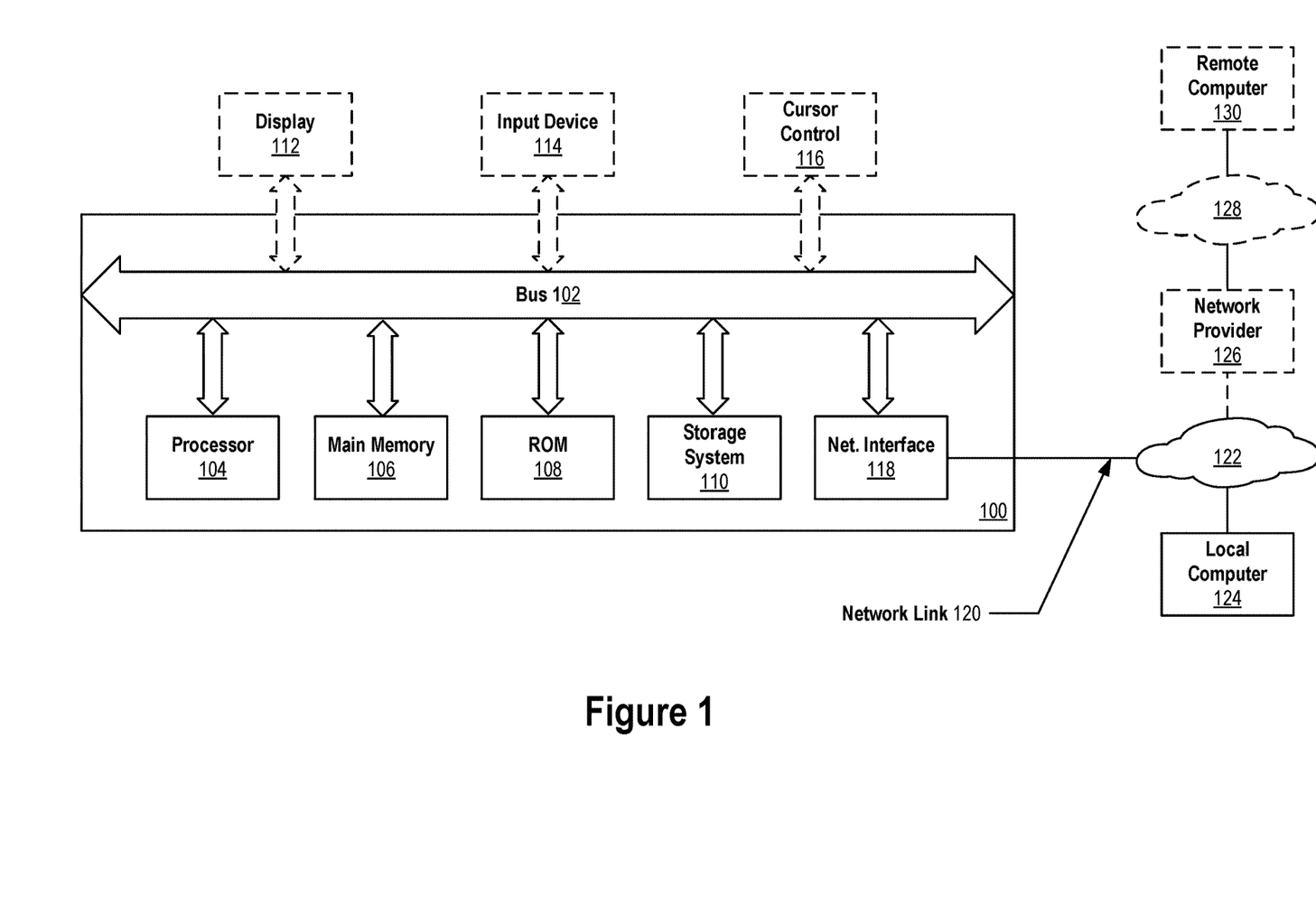
FIG. 1 illustrates an example computer system in accordance with some implementations.

FIG. 1 is a block diagram of an example computer system 100 in accordance with some implementations. Computer system 100 includes bus 102 or other communication mechanism for communicating information, and one or more hardware processors coupled with bus 102 for processing information. Hardware processor 104 may be, for example, a general-purpose microprocessor, a central processing unit (CPU) or a core thereof, a graphics processing unit (GPU), or a system on a chip (SoC).

Computer system 100 also includes a main memory 106, typically implemented by one or more volatile memory devices, coupled to bus 102 for storing information and instructions to be executed by processor 104. Main memory 106 also may be used for storing temporary variables or other intermediate information during execution of instructions by processor 104. Computer system 100 may also include read-only memory (ROM) 108 or other static storage device coupled to bus 102 for storing static information and instructions for processor 104. A storage system 110, typically implemented by one or more non-volatile memory devices, is provided and coupled to bus 102 for storing information and instructions.

Computer system 100 may be coupled via bus 102 to display 112, such as a liquid crystal display (LCD), a light emitting diode (LED) display, or a cathode ray tube (CRT), for displaying information to a computer user. Display 112 may be combined with a touch sensitive surface to form a touch screen display. The touch sensitive surface is an input device for communicating information including direction information and command selections to processor 104 and for controlling cursor movement on display 112 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 114, including alphanumeric and other keys, may be coupled to bus 102 for communicating information and command selections to processor 104.

Another type of user input device may be cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Instructions, when stored in non-transitory storage media accessible to processor 104, such as, for example, main memory 106 or storage system 110, render computer system 100 into a special-purpose machine that is customized to perform the operations specified in the instructions. Alternatively, customized hard-wired logic, one or more ASICs or FPGAs, firmware and/or hardware logic which in combination with the computer system causes or programs computer system 100 to be a special-purpose machine.

A computer-implemented process may be performed by computer system 100 in response to processor 104 executing one or more sequences of one or more instructions contained in main memory 106. Such instructions may be read into main memory 106 from another storage medium, such as storage system 110. Execution of the sequences of instructions contained in main memory 106 causes processor 104 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 110) and/or volatile media (e.g., main memory 106). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus ~02. Transmission media can also take the form of acoustic or light waves, such as those generated during radio-wave and infra-red data communications.

Computer system 100 also includes a network interface 118 coupled to bus 102. Network interface 118 provides a two-way data communication coupling to a wired or wireless network link 120 that is connected to a local, cellular or mobile network 122. For example, communication interface 118 may be IEEE 802.3 wired "ethernet" card, an IEEE 802.11 wireless local area network (WLAN) card, a IEEE 802.15 wireless personal area network (e.g., Bluetooth) card or a cellular network (e.g., GSM, LTE, etc.) card to provide a data communication connection to a compatible wired or wireless network. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through network 122 to local computer system 124 that is also connected to network 122 or to data communication equipment operated by a network access provider 126 such as, for example, an internet service provider or a cellular network provider. Network access provider 126 in turn provides data communication connectivity to another data communications network 128 (e.g., the internet). Networks 122 and 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the networks 122 and 128, network link 120 and communication interface 118. In the internet example, a remote computer system 130 might transmit a requested code for an application program through network 128, network 122 and communication interface 118. The received code may be executed by processor 104 as it is received, and/or stored in storage device 910, or other non-volatile storage for later execution.

Terminology

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

The terminology used in the foregoing detailed description and in the appended claims of the various described implementations herein is for the purpose of describing particular implementations only and is not intended to be limiting. As used in the foregoing detailed description and in the appended claims of the various described implementations, the singular forms "a," "an," and "the" are intended to include the plural forms as well, unless the context clearly indicates otherwise. It will also be understood that the term "and/or" as used in the foregoing detailed description and in the appended claims refers to and encompasses any and all possible combinations of one or more of the associated listed items. It will be further understood that the terms "includes," "including," "comprises," and/or "comprising," when used in the foregoing detailed description and in the appended claims, specify the presence of stated features, integers, steps, operations, elements, and/or components, but do not preclude the presence or addition of one or more other features, integers, steps, operations, elements, components, and/or groups thereof.

As used in the foregoing detailed description and in the appended claims, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which implementations discussed above collect information about users, the users may be provided with an opportunity to opt in/out of programs or features that may collect personal information. In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Extensions and Alternatives

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

The invention claimed is:

1. A method for online analytical processing, comprising:
storing metadata for a target metric;
wherein the metadata for the target metric specifies one or more dimensions by which the target metric can be broken down;
obtaining a particular metric-centric query language statement that expressly references the target metric and does not expressly reference a particular underlying structured database table;
wherein the particular metric-centric query language statement expressly specifies a particular target dimension of the one or more dimensions by which the target metric can be broken down;
wherein the metadata for the target metric comprises an association between the particular target dimension and a particular column of the particular underlying structured database table;
based at least on the metadata for the target metric including the association between the particular target dimension and the particular column of the particular underlying structured database table, transforming the particular metric-centric query language statement to a particular structured query language statement that does expressly reference the particular underlying structured database table;
wherein the particular structured query language statement comprises a group by clause that references the particular column of the particular underlying structured database table;
causing an execution of the particular structured query language statement against the particular underlying structured database table; and
providing an answer to the particular metric-centric query language statement based at least on results of the execution.

2. The method of claim 1, wherein the metadata specifies an implied aggregation operation; wherein the particular metric-centric query language statement does not expressly reference the implied aggregation operation; and wherein the particular structured query language statement does expressly reference the implied aggregation operation.

3. The method of claim 1, wherein:
the metadata specifies a first column of a first structured database table and a first column of a second structured database table;
the method further comprises determining, based at least on the particular metric-centric query language statement, that the particular structured query language statement should include a join operation involving the first column of the first structured database table and the first column of the second structured database table;
the particular metric-centric query language statement does not expressly reference any of the join operation, the first column of the first structured database table, the first column of the second structured database table, the first structured database table, the second structured database table; and
the particular structured query language statement expressly references the join operation.

4. The method of claim 1, wherein the particular metric-centric query language statement comprises a filter clause or a time clause.

5. The method of claim 1, wherein the particular metric-centric query language statement expressly specifies an arithmetic expression having a plurality of target metrics and at least one arithmetic operator; and wherein the answer includes a result of evaluating the arithmetic expression.

6. The method of claim 1, wherein the answer is provided in a graphical user interface.

7. The method of claim 1, wherein the particular structured query language statement further comprises at least one join operation and at least one aggregation operation.

8. A computing system for online analytical processing, comprising:
one or more processors; and
storage media having instructions stored thereon for execution by the one or more processors, the instructions configured for:
storing metadata for a target metric;
wherein the metadata for the target metric specifies one or more dimensions by which the target metric can be broken down;
obtaining a particular metric-centric query language statement that expressly references the target metric and does not expressly reference a particular underlying structured database table;
wherein the particular metric-centric query language statement expressly specifies a particular target dimension of the one or more dimensions by which the target metric can be broken down;
wherein the metadata for the target metric comprises an association between the particular target dimension and a particular column of the particular underlying structured database table;
based at least on the metadata, transforming the particular metric-centric query language statement to a particular structured query language statement that does expressly reference the particular underlying structured database table;
wherein the particular structured query language statement comprises a group by clause that references the particular column of the particular underlying structured database table;
causing an execution of the particular structured query language statement against the particular underlying structured database table; and
providing an answer to the particular metric-centric query language statement based at least on results of the execution.

9. The computing system of claim 8, wherein the metadata specifies an implied aggregation operation; wherein the particular metric-centric query language statement does not expressly reference the implied aggregation operation; and wherein the particular structured query language statement does expressly reference the implied aggregation operation.

10. The computing system of claim 8, wherein:
the metadata specifies a first column of a first structured database table and a first column of a second structured database table;
the instructions are further configured for determining, based at least on the particular metric-centric query language statement, that the particular structured query language statement should include a join operation involving the first column of the first structured database table and the first column of the second structured database table;
the particular metric-centric query language statement does not expressly reference any of the join operation, the first column of the first structured database table, the first column of the second structured database table, the first structured database table, the second structured database table; and
the particular structured query language statement expressly references the join operation.

11. The computing system of claim 8, wherein the particular metric-centric query language statement comprises a filter clause or a time clause.

12. The computing system of claim 8, wherein the particular metric-centric query language statement expressly specifies an arithmetic expression having a plurality of target metrics and at least one arithmetic operator; and wherein the answer includes a result of evaluating the arithmetic expression.

13. The computing system of claim 8, wherein the answer is provided in a graphical user interface.

14. The computing system of claim 8, wherein the particular structured query language statement further comprises at least one join operation and at least one aggregation operation.

15. One or more non-transitory computer-readable media storing one or more programs for online analytical processing, the one or more programs having instructions configured for:
storing metadata for a target metric;
wherein the metadata for the target metric specifies one or more dimensions by which the target metric can be broken down;
obtaining a particular metric-centric query language statement that expressly references the target metric and does not expressly reference a particular underlying structured database tables;
wherein the particular metric-centric query language statement expressly specifies a particular target dimension of the one or more dimensions by which the target metric can be broken down;
wherein the metadata for the target metric comprises an association between the particular target dimension and a particular column of the particular underlying structured database table;
based at least on the metadata, transforming the particular metric-centric query language statement to a particular structured query language statement that does expressly reference the particular underlying structured database table;
wherein the particular structured query language statement comprises a group by clause that references the particular column of the particular underlying structured database table;
causing an execution of the particular structured query language statement against the particular underlying structured database table; and
providing an answer to the particular metric-centric query language statement based at least on results of the execution.

16. The one or more non-transitory computer-readable media of claim 15, wherein the metadata specifies an implied aggregation operation; wherein the particular metric-centric query language statement does not expressly reference the implied aggregation operation; and wherein the particular structured query language statement does expressly reference the implied aggregation operation.

17. The one or more non-transitory computer-readable media of claim 15, wherein:
the metadata specifies a first column of a first structured database table and a first column of a second structured database table;
the instructions are further configured for determining, based at least on the particular metric-centric query language statement, that the particular structured query language statement should include a join operation involving the first column of the first structured database table and the first column of the second structured database table;
the particular metric-centric query language statement does not expressly reference any of the join operation, the first column of the first structured database table, the first column of the second structured database table, the first structured database table, the second structured database table; and
the particular structured query language statement expressly references the join operation.

18. The one or more non-transitory computer-readable media of claim 15, wherein the particular metric-centric query language statement comprises a metric clause and at least one of: a breakdown clause, a filter clause or a time clause.

19. The one or more non-transitory computer-readable media of claim 15, wherein the particular metric-centric query language statement expressly specifies an arithmetic expression having a plurality of target metrics and at least one arithmetic operator; and wherein the answer includes a result of evaluating the arithmetic expression.

20. The one or more non-transitory computer-readable media of claim 15, wherein the particular structured query language statement further comprises at least one join operation and at least one aggregation operation.

\* \* \* \* \*

UNITED STATES PATENT AND TRADEMARK OFFICE
CERTIFICATE OF CORRECTION

| | | |
|---|---|---|
| PATENT NO. | : 10,990,612 B2 | Page 1 of 1 |
| APPLICATION NO. | : 16/235910 | |
| DATED | : April 27, 2021 | |
| INVENTOR(S) | : Maneesh Varshney et al. | |

It is certified that error appears in the above-identified patent and that said Letters Patent is hereby corrected as shown below:

In the Claims

Column 18:
Lines 44-45: Claim 18: Delete: "a metric clause and at least one of: a breakdown clause,"

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*